March 16, 1926.

J. C. SWAN 1,576,867

METHOD OF COLLECTING, CONSERVING, AND STORING NATURAL COLD

Filed May 16, 1925

Inventor
J. C. Swan.

Patented Mar. 16, 1926.

1,576,867

UNITED STATES PATENT OFFICE.

JOHN C. SWAN, OF MARIETTA, OHIO.

METHOD OF COLLECTING, CONSERVING, AND STORING NATURAL COLD.

Application filed May 16, 1925. Serial No. 30,682.

*To all whom it may concern:*

Be it known that I, JOHN C. SWAN, a resident of Marietta, county of Washington, and State of Ohio, and a citizen of the United States, have invented certain new and useful Improvements in Methods of Collecting, Conserving, and Storing Natural Cold, of which the following is a specification, reference being had to the accompanying drawing, forming a part thereof.

My invention relates to a method for collecting conserving and storing natural or atmospheric cold, and has for its object to conserve or store the cold of the winter season so that it may be drawn upon in the summer for the manufacture of ice and for other cooling purposes.

Throughout a considerable portion of the United States the atmospheric temperature varies between wide limits, the temperature in winter falling at times considerably below the freezing point of water, to as low as 40 degrees below zero F. To the heat of the summer months the production of crops is directly attributable; but the cold of the winter though not without indirect effect upon the production of the summer crops, produces directly but one crop of commercial value, that is ice, and the production of ice as a crop of commercial value is dependent upon so many conditions other than the intensity and duration of the cold that the energy of the cold of the winter months may be said to be only slightly made use of commercially.

It is the object of my invention to provide a method by which the cold of the winter in localities in which the atmospheric cold drops substantially below that at which water is congealed, may be so conserved or stored as to be available for use during the summer season or at any other time for the manufacture of ice or for any other purpose for which a temperature below the freezing point of water may be desired.

It is a further object of my invention to make use, for the purpose of conserving or storing cold, of natural instrumentalities, particularly the heat insulating qualities of earth.

It is a further object of my invention to utilize for storage purposes not only so much of the atmospheric cold as may be required to cool the storage body to the freezing point of water, but also to utilize the cold of temperatures as low as may be experienced during winter season to cool the ice so formed or the liquid used for storage of the cold to such low temperature and maintain it at such low temperature until used—in other words, to store super-cold.

It is a further object of my invention to thus conserve and store natural cold in a simple and inexpensive manner without the use of apparatus either expensive to construct or to use.

With the objects above indicated in view, my invention consists in the method hereinafter described and claimed.

Referring to the drawings.

Figure 1:
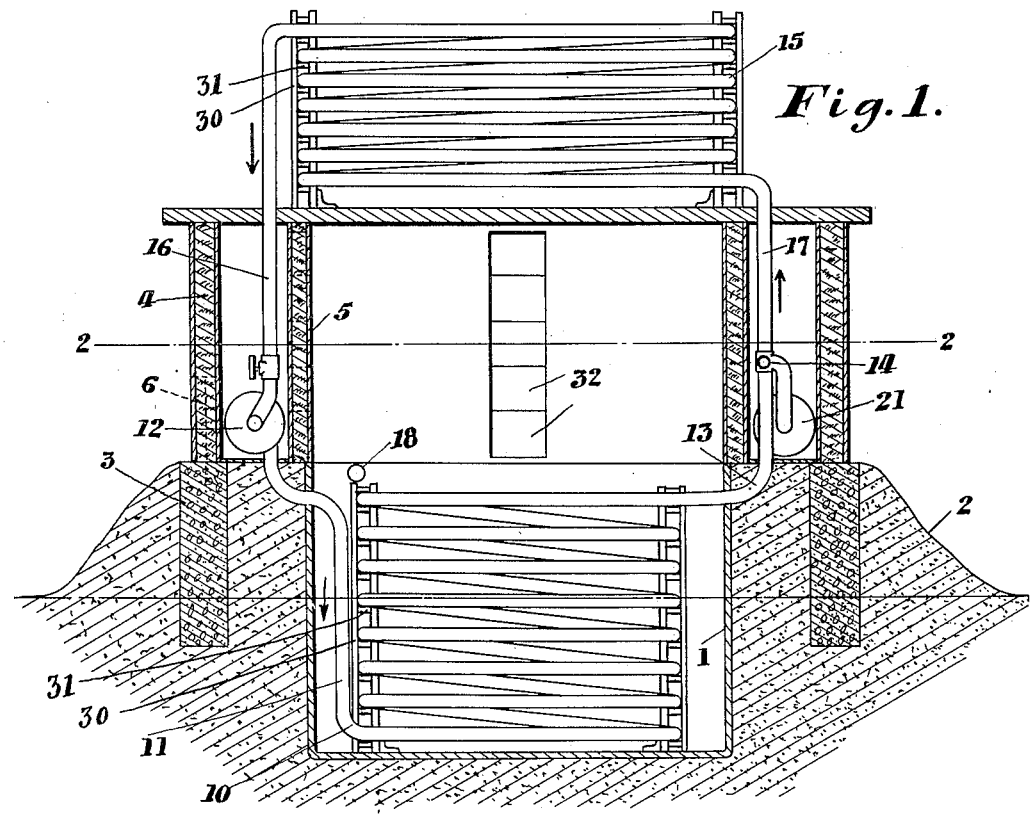
Figure 1 is a vertical sectional view of a construction of plant adapted for use in carrying out my invention, the construction being shown diagrammatically.
Figure 2:
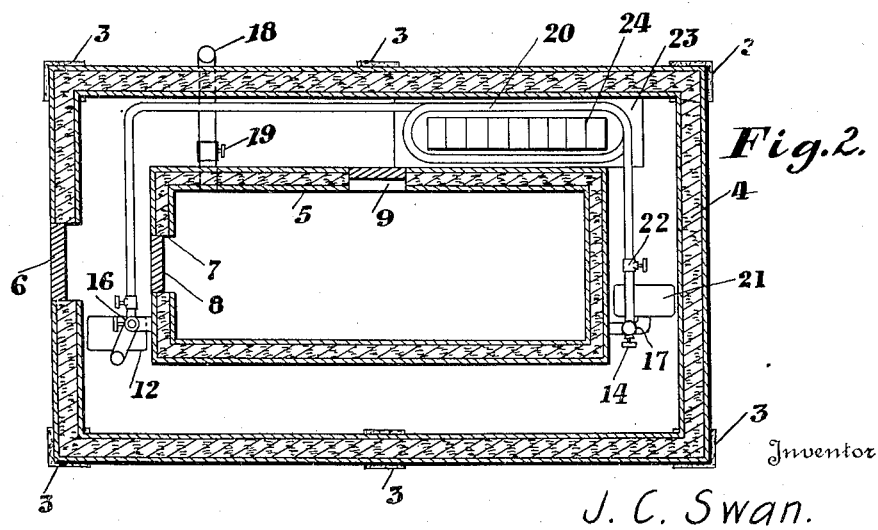
Fig. 2 is a horizontal sectional view on line 2—2 of Figure 1.

Referring to the drawings which are illustrative only of a construction which may be used to carry out my invention and are not intended to limit the invention to the construction shown or to any particular construction, 1 indicates a tank adapted to contain a relatively large body of water and surrounded on all sides with earth. For this purpose the tank may be sunk in the ground to its full depth, but in order to save the cost of excavation the tank is preferably sunk to about one-half its depth and the material excavated to provide for so sinking the tank is so piled up about the tank, as shown, as to surround the tank with a body of earth of such lateral extent as to effectively serve to insulate the tank against atmospheric changes in temperature or the effect of the radiant energy of the sun's rays.

The tank may be conveniently made forty feet in depth, sunk for twenty feet in the ground and with earth banked up about it in a bank indicated at 2, extending twenty feet above the surface of the ground and, at its top, ten to twenty feet wide. The tank may be of any size desired, preferably not less than forty feet long and twenty to forty feet wide.

At suitable intervals about the tank are arranged pillars 3 which, for convenience, should be built before the excavation for the tank is completed, and preferably have their bases at the natural ground surface. These pillars extend to the level of the upper edge of the tank and are of such number and strength as to be capable of supporting the outer walls 4 of the ice house construction with the coils of pipe carried upon its roof. This ice house is preferably of steel frame construction with its walls of such material and thickness as to be non-conductive as is common in ice-house construction.

Within the outer walls 4 at a distance of from at least ten feet are the walls 5 of an ice storage chamber. The outer wall 4 should be provided with an opening closed by door 6, and the ice-storage chamber wall should be provided with a vertical opening 7 extending from top to bottom, near or in line with door 6 and closed by a series of doors 8, any one or more of which may be opened as desired. The ice storage chamber is preferably provided also with an opening 9 near the freezing cans, hereinafter described, similar to opening 7, and closed by a series of doors 32. By means of the doors 32, cakes of ice may be introduced into the ice storage chamber at the level of the ice already packed in it, and by means of the doors 8 cakes of ice may be taken out at the level of the ice in the storage chamber.

Within the tank 1 is arranged a coil 10 of pipe extending about and across the tank from near its bottom to near its top the coils extending across the tank at relatively slight intervals and being spaced vertically apart a short distance only. This coil is preferably continuous, the sections of pipe from which it is formed being united by welding. This coil may be termed the freezing coil. The lowermost coil is connected by a vertical pipe 11 to a circulating pump 12, preferably a centrifugal or rotating pump, and from the uppermost coil pipe 13 leads to a point above the floor of the ice house, and is there provided with a valve 14.

At a suitable distance above the surface of the ground, here shown as arranged upon the roof of the ice-house, are coils of a pipe 15, which may be termed the aerial. These coils are so arranged that they will be vertically separated one from another by a relatively slight distance only sufficient to permit free circulation of air between the coils. At one end the pipe 15 is connected by vertical pipe 16 with the pump 12. The other end of the coil 15 is connected by vertical pipe 17 to the valve 14 at the end of the vertical pipe 13. The coils of the freezing coil 10 and the coils of the aerial 15 may be conveniently supported by pairs of uprights 30 carrying a pin 31 for each coil, the coils being thus free to move upward in contracting or expanding. The pipe of the aerial coil 15 and preferably that of the freezing coil 10 are painted black preferably with a paint of graphite or lampblack in oil.

An inlet pipe 18, controlled by valve 19, is connected with any suitable source of water supply for filling tank 1 as desired.

In operation the pipes 10 and 15 are filled with liquid which will not freeze at any atmospheric temperature likely to be experienced in the locality in which the invention is to be used and when the atmospheric temperature is substantially below freezing—32° F.—the liquid in the pipe 15 will be cooled to atmospheric temperature, the cooling to this temperature taking place rapidly if the wind is blowing. Assuming that the atmospheric temperature is 10 degrees above zero F. and a strong wind blowing, the liquid, such as a mixture of alcohol and water in suitable proportions is quickly cooled to this temperature. The pump 12 being started and the valve 14 being turned to connect pipe 13 with pipe 17, the cold liquid is forced downward into the lowermost coil of pipe 10, and, passing through the successive coils, passes out of the uppermost coil through pipe 13 and valve 14 to pipe 17, to again pass through the coils of pipe 15.

Before this circulation begins water is admitted to tank 1 through inlet pipe 18 to such extent as may be desired, preferably at first only to an extent sufficient to cover the lowermost coils of pipe 10. The water so introduced should be as cold as can be conveniently obtained, preferably as near as possible to 32 degrees F. The cold liquid circulating through the coils 10 congeals the water surrounding them to form a solid body of ice. The liquid, somewhat warmed by absorbing heat from the water, passes up through pipes 13 and 17 to be again cooled to atmospheric temperature and, a further supply of water being allowed to enter the tank, congeals the further supply thus building up in the tank successive layers of ice until the tank is filled with a solid cake of ice. The tank is open at its top so that the expansion due to freezing of the water is taken care of without damage. As the cold liquid continues to be circulated after the tank is filled with ice, the ice is itself cooled to the temperature of the circulating liquid.

Whenever the atmospheric temperature is above that to which the ice has been cooled the pump 12 is stopped and the valve 14 is closed to close connection between the freezing coil 10 and the aerial 15.

The body of ice thus formed in the tank 1 being insulated by the earth surrounding it will remain at approximately the temperature to which it has been cooled for an indefinite time, except so far as concerns action at its upper surface, and such action is prevented by storing ice in the ice storage chamber. Ice for filling the ice storage chamber is to be made by use of liquid circulated through pipe 10. Valve 14 is a bypass or three-way valve and, when turned to suitable position, connects pipe 13 with a coil 20 arranged in the space between the outer wall 4 of the ice house and the wall 5 of the ice-storage chamber, the other end of the coil 20 being connected to a pump 21, which is connected to pipe 11 through valve 22. This coil 20 is arranged in a tank 23 which is filled with brine into which cans 24 containing water, preferably distilled, are set. The pump 21 being started, the cold liquid in coil 10 at a temperature to which the ice in tank 1 has been cooled is circulated through coil 20, cooling the brine to below the freezing temperature and causes the water in cans 24 to freeze into solid cakes of ice. The blocks of ice taken from the cans may be moved into the ice storage chamber through opening 9 and stacked upon the surface of the block of ice in tank 1, the layers and the rows of cakes of ice in each layer being suitably separated to prevent their uniting into a solid mass, which would make it difficult to get out the cakes as wanted. The ice thus stored in the ice-storage chamber serves to insulate the surface of the mass of ice which fills tank 1. The mass of ice which fills the tank 1 is thus insulated at bottom, sides and ends by earth and on top by the ice in the ice storage chamber.

When the ice storage chamber is filled with cakes of ice made, as above described, from distilled water, the aerial 15 may be drained of liquid and, if desired, the liquid may be pumped out of the freezing coil 10. The ice in tank 1 being at a temperature materially below the freezing point and being insulated on all sides, will not melt appreciably, if at all, in the warm weather of summer. Ice from the ice-storage chamber may be taken out as wanted through opening 7 and door 6 of the ice house for delivery to customers. As the supply of ice cakes in the ice-storage chamber becomes reduced, it may be replenished by resuming the manufacture of ice cakes by pumping liquid through coil 10 and through coil 20. The ice in tank 1 will continue to serve as a reservoir of cold for use in making ice or for such other purpose as may be desired. In this circulation of liquid through coil 10 for use in ice-making the circulating liquid may be the liquid used in the freezing operation or any other suitable liquid of suitably low freezing point.

When the apparatus is first installed the atmospheric temperature if only slightly below freezing may be utilized to cool the water in the tank which, as above pointed out, should at first fill the tank only for a few feet, the pump being set in operation to circulate the low-freezing liquid through the aerial coil and the freezing coil. When the atmospheric temperature drops to 15 degrees above zero F. the circulation of the low-freezing liquid through the freezing coil, after it is circulated through the aerial coil, will cause the water in tank 1, which is in contact with the coils to freeze, the freezing gradually extending until all of the water then in the tank is frozen. More water is then admitted and is frozen in the same way, and the admission of water and the freezing of the additional water admitted is continued until the tank is filled up to its upper edge with solid ice. This step by step or gradual freezing is of particular importance to prevent the destructive action upon the coils due to contraction or expansion which would be likely to result if the whole body of water were frozen at the same time. After the ice is thus formed a continuance of the circulation will cool the ice below the freezing temperature and if at any time the atmospheric temperature drops materially, circulation of the low-freezing liquid will further cool the ice. Atmospheric temperature at or below zero F. may thus be utilized to cool the ice to zero or lower and being insulated on all sides the block of ice filling the tank will retain this low temperature, or super-cold, in large measure, until by circulation of the liquid through coil 10 the cold is absorbed to a greater or less extent. Whenever the atmospheric conditions have been such that it has been possible to thus cool the ice to a temperature materially below that at which it was formed, care should be taken to avoid further circulation of the low freezing liquid so long as the atmospheric temperature is above the temperature to which the ice has been cooled.

The water in tank 1 having once been frozen into a solid block of ice, care should be taken to, at all times, keep a substantial body of cakes of ice in the ice-storage chamber so as to insulate the upper surface of this solid block of ice. It is not contemplated or intended that this block of ice should be permitted to melt so far as avoidable from year to year, but once formed should remain a permanently solid mass, being drawn upon only to the extent of raising its temperature slightly above the lowest temperature to which it was cooled without raising it above the temperature at which melting would result, the extent to which the temperature is thus raised depending upon the extent to which the reserve cold is needed for use in making ice for distribution. The body of ice formed as described will tend to cool the earth surrounding it, or prevent it from thawing if frozen, with the result of increasing the insulating effect.

While I have shown the tank 1 as it would appear if constructed of sheet material and, if desired, it may be so constructed, the walls of the tank may be of concrete or masonry or may be of earth only, and any pit or depression natural or artificial of suitable area and depth to be capable of holding the desired amount of water may be utilized as the tank 1. It is important that the body of water in the storage means be insulated on all sides by a body of earth of such extent as will be sufficient to prevent the heat action of radiant energy from any side, and that the upper surface be capable of being protected from radiant energy by a building or otherwise. But it is not necessary that the walls of earth or other material be leakproof for the reason that in forming the body of ice by building it up from the bottom, as described, the first layer of ice serves to seal the bottom of the tank against leakage and as the successive layers of ice are formed the walls are also sealed against leakage.

The ice house is here shown as covering the entire top surface of the tank 1 and while this may be desirable, the ice house may cover a portion only of this top surface in which case, however, the top surface not covered by the ice house would need to be protected by earth or other insulating covering.

While I have described my invention as applied to conserving or storing cold by converting water into ice, I do not wish to be restricted to the production of ice as the same results, as regards storage of cold, may be secured if, instead of water which will freeze at 32 degrees F., the tank 1 is filled with water having in solution calcium chloride or other solution by which the freezing point is lowered. If a suitable solution is used its temperature may be lowered far below the freezing point of water without forming ice. The use of such a solution has the advantage of affording a storage body of much higher specific heat than that of ice and consequently a capacity for storage of a greater amount of energy of cold for a given amount of weight of the storage medium.

If such a non-freezing solution is used as the storage medium it will, of course, be necessary to provide a covering for the tank to support such insulating material as may be used to protect the surface of the liquid from radiant energy.

Having thus described my invention, what I claim is:

1. The method of collecting, conserving and storing natural cold, which consists in cooling an enclosed body of liquid having its freezing point materially below the freezing point of water by exposing it to the atmosphere when the atmospheric temperature is below 32 degrees F., circulating the liquid so cooled through coils arranged within a tank insulated from atmospheric and radiant heat, and supplying the tank with liquid to be cooled by the action of the cooled liquid so circulated, to form a reservoir of abstracted heat within the tank having a temperature below the freezing point of water.

2. The method of collecting, conserving and storing natural cold, which consists in cooling an enclosed body of liquid having its freezing point materially below the freezing point of water by exposiing it to the atmosphere when the atmospheric temperature is below 32 degrees F., circulating the liquid by mechanical means so cooled through coils arranged within a tank insulated from atmospheric and radiant heat, supplying the tank with liquid to be cooled by the action of the cooled liquid so circulated, to form a storage body within the tank and continuing to circulate the cooled liquid through the storage body thus formed within the tank to cool said storage body thus formed to the lowest temperature to which the circulating liquid may be cooled by the atmosphere.

3. The method of collecting, conserving and storing natural cold, which consists in cooling an enclosed body of liquid having its freezing point materially below the freezing point of water by exposing it to the atmosphere when the atmospheric temperature is below 32 degrees F., circulating the liquid so cooled through coils arranged within a tank insulated from atmospheric and radiant heat, leading it first to the lowermost coils supplying water to the tank to cover the lower coils only, continuing to circulate the cooled liquid until the water so supplied is congealed and supplying additional water as it is congealed until the tank is filled to its top with a body of ice.

4. The method of conserving and storing natural cold, which consists in cooling an enclosed body of liquid having its freezing point materially below the freezing point of water by exposing it to the atmosphere when the atmospheric temperature is below 32 degrees F., circulating the liquid so cooled through coils arranged within a tank adapted to contain water and surrounded on all sides by a body of water, and supplying the tank with water to be congealed by the action of the cooled liquid so circulated, to form a body of ice within the tank, circulating liquid having its freezing point below the temperature of the body of ice so formed through freezing devices adapted to form ice in cakes.

5. The method of conserving and storing natural cold, which consists in so arranging a tank adapted to contain water that it will be surrounded on all sides by a body of earth of sufficient thickness to insulate it from atmospheric and radiant heat, cooling an enclosed body of liquid having its freezing point materially below the freezing point of water by exposing it to the atmosphere when the atmospheric temperature is below 32 degrees F., circulating the liquid so cooled through coils arranged within the insulated tank, and supplying the tank with water to be congealed by the action of the cooled liquid so circulated, to form a body of ice within the tank, circulating liquid having a freezing point below the temperature of the body of ice so formed through freezing devices adapted to form ice in cakes, and storing the ice cakes so formed in the tank to insulate its surface from atmospheric heat.

In testimony whereof, I hereunto affix my signature.

JOHN C. SWAN.